(12) United States Patent
Sugimoto et al.

(10) Patent No.: US 8,866,958 B2
(45) Date of Patent: Oct. 21, 2014

(54) FOCUSING APPARATUS

(75) Inventors: Kazuhiko Sugimoto, Seongnam-si (KR); Jong-hoon Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 13/223,654

(22) Filed: Sep. 1, 2011

(65) Prior Publication Data

US 2012/0062788 A1  Mar. 15, 2012

(30) Foreign Application Priority Data

Sep. 13, 2010 (KR) .................... 10-2010-0089699

(51) Int. Cl.
  *G03B 13/00* (2006.01)
  *H04N 5/232* (2006.01)
  *G03B 17/14* (2006.01)

(52) U.S. Cl.
  CPC ............ *H04N 5/23212* (2013.01); *G03B 17/14* (2013.01)
  USPC ......................................... 348/356; 348/353

(58) Field of Classification Search
  USPC .............................. 348/353, 354; 396/79, 102
  See application file for complete search history.

(56) References Cited

U.S. PATENT DOCUMENTS

2003/0117517 A1\*  6/2003  Ogino .......................... 348/356

\* cited by examiner

*Primary Examiner* — Paul Berardesca
(74) *Attorney, Agent, or Firm* — Drinker Biddle & Reath LLP

(57) ABSTRACT

A focusing apparatus including a focus lens; a focus lens driving unit that drives the focus lens; an imaging device configured to generate an image signal; a focus evaluation value calculating unit configured to receive an image signal from the imaging device and to calculate a focus evaluation value of a captured image; a difference calculating unit configured to calculate a difference between a current focus evaluation value and a previous focus evaluation value; a first determining unit configured to compare the difference to each of a plurality of threshold values different from each other; a counter configured to count results of comparing the difference to each of the plurality of threshold values and to generate count information; and a second determining unit configured to compare the count information to threshold count information and to determine a target drive direction in which the focus lens is to be driven.

16 Claims, 12 Drawing Sheets

FOCUSING APPARATUS

CROSS-REFERENCE TO RELATED PATENT APPLICATION

This application claims the benefit of Korean Patent Application No. 10-2010-0089699, filed on Sep. 13, 2010, in the Korean Intellectual Property Office, the entire disclosure of which is incorporated herein by reference.

BACKGROUND

1. Field of the Invention

The invention relates to an auto-focusing apparatus using contrast.

2. Description of the Related Art

In an apparatus for auto-focusing by using contrast, a focus lens is moved, at which a high frequency component (focus evaluation value) of an image signal is greatest. A direction in which the focus lens is driven to find the greatest high frequency component is determined based on whether the high frequency component is increasing or decreasing. However, noise such as hand-shake may affect the high frequency component. To adjust for the noise that may be affect the high frequency component, a threshold value for determining whether the high frequency component is increasing or decreasing may be used. The determination of the high frequency component is often performed over a predetermined period of time to increase the reliability of the determination.

Thresholds are often used in two ways. First, a large threshold value may be used for determining whether the high frequency component is increasing or decreasing. This case may be advantageous in terms of a short lens driving time, but it may be difficult to determine whether the high frequency component is increasing or decreasing because of the high threshold value. Second, a small threshold value may be used for determining whether the high frequency component is increasing or decreasing. In this case, the lens driving time may be long, but, advantageously, whether the high frequency component is increasing or decreasing may be determined with higher reliability than with a large threshold. Both, low and high thresholds have disadvantages and finding the greatest high frequency component is very important for an in-focus image that will satisfy the consumer.

SUMMARY

Therefore, there is a need in the art for a focusing apparatus including a focus lens; a focus lens driving unit configured to drive the focus lens; an imaging device configured to capture light passed through the focus lens and incident on the imaging device and to generate an image signal; a focus evaluation value calculating unit configured to receive an image signal from the imaging device and to calculate a focus evaluation value of a captured image; a difference calculating unit configured to calculate a difference between a current focus evaluation value and a previous focus evaluation value; a first determining unit configured to compare the difference to each of a plurality of threshold values different from each other; a counter configured to count results of comparing the difference to each of the plurality of threshold values and to generate count information; and a second determining unit configured to compare the count information to threshold count information and to determine a target drive direction in which the focus lens is to be driven.

The threshold count information may include a plurality of pieces of threshold count information respectively corresponding to the threshold values.

The threshold values may include a first threshold value and a second threshold value smaller than the first threshold value, and the threshold count information may include a first threshold count information corresponding to the first threshold value and second threshold count information corresponding to the second threshold value and greater than the first threshold count information.

The focusing apparatus may include a current position determining unit configured to determine a current position of the focus lens, wherein, if the current position of the focus lens is close to a near side, the focus lens driving unit drives the focus lens in a direction toward a far side, and if the current position of the focus lens is close to the far side, the focus lens driving unit drives the focus lens in a direction toward the near side.

The focus evaluation value calculating unit may further be configured to calculate a focus evaluation value while moving the focus lens in a direction.

The counter may further be configured to generate first count information regarding a result of comparing the difference to a first threshold value, and the counter is further configured to generate second count information regarding a result of comparing the difference to a second threshold value.

The counter may further be configured to increase the first count information by predetermined value, if the focus lens is driven in a direction toward a near side and the difference is greater than the first threshold value; to decrease the first count information by the predetermined value, if the focus lens is driven in a direction toward the near side and the difference is smaller than the first threshold value; to decrease the first count information by the predetermined value, if the focus lens is driven in a direction toward a far side and the difference is greater than the first threshold value; and, to increase the first count information by the predetermined value, if the focus lens is driven in a direction toward the far side and the difference is greater than the first threshold value.

The counter may further be configured to increase the second count information by a predetermined value, if the focus lens is driven in a direction toward a near side and the difference is greater than the second threshold value; to decrease the second count information by the predetermined value, if the focus lens is driven in a direction toward the near side and the difference is smaller than the second threshold value; to decrease the second count information by the predetermined value, if the focus lens is driven in a direction toward a far side and the difference is greater than the second threshold value; and, to increase the second count information by the predetermined value, if the focus lens is driven in a direction toward the far side and the difference is greater than the second threshold value.

The second determining unit may be configured to compare at least one of the first count information, the second count information, and a sum thereof to corresponding threshold count information.

The second determining unit may be configured to determine a target drive direction of the focus lens, if a value of the first count information is 1 or more.

The second determining unit may be configured to determine a target drive direction, if the first count information satisfies first threshold count information corresponding to the first count information.

The second determining unit may be configured to determine a target drive direction, if the second count information satisfies second threshold count information corresponding to the second count information.

A focusing method is disclosed. The method including generating a first image signal; calculating a focus evaluation value of the first image signal as a previous focus evaluation value; driving the focus lens; generating a second image signal; calculating a focus evaluation value of the second image signal as a current focus evaluation value; calculating a difference between the current focus evaluation value and the previous focus evaluation value; comparing the difference to each of a plurality of threshold values different from each other; counting results of comparing the difference to each of the plurality of threshold values and to generate count information; and comparing the count information to threshold count information and determining a target drive direction in which the focus lens is to be driven based on the comparison.

The threshold count information may include a plurality of pieces of threshold count information respectively corresponding to the threshold values.

The threshold values may include a first threshold value and a second threshold value smaller than the first threshold value, and the threshold count information may include first threshold count information corresponding to the first threshold value and second threshold count information corresponding to the second threshold value and greater than the first threshold count information.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, a digital camera will be described in detail as an example of focusing apparatuses according to embodiments of the invention. Although the current embodiment provides a digital camera as a focusing apparatus, the invention is not limited thereto, and descriptions of the current embodiment may also be applied to any of various digital apparatuses including a focusing apparatus, such as a camcorder, a personal digital assistant (PDA), a mobile phone, or the like.

Figure 1:
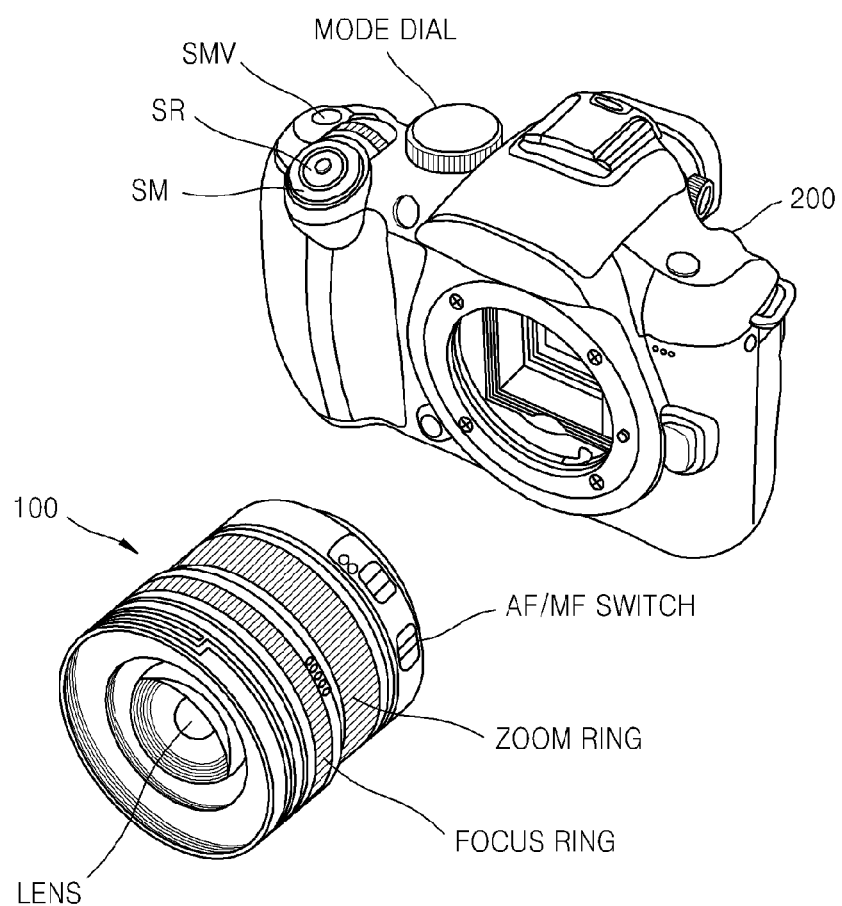
FIG. 1 is a diagram of a focusing apparatus according to an embodiment of the invention.

FIG. 1 is a diagram of a focusing apparatus according to an embodiment of the invention. In detail, FIG. 1 is a perspective front view of a lens-exchangeable digital camera.

First, referring to FIG. 1, an exchangeable lens 100 and a body 200 are shown.

The exchangeable lens 100 includes a LENS and includes a ZOOM RING for adjusting a focal length of the lens and a FOCUS RING for manual focus adjustment around the lens. Furthermore, the exchangeable lens 100 includes an auto-focusing (AF)/manual-focusing (MF) mode switch, AF/MF SWITCH, for switching between an AF mode and an MF mode.

A MODE DIAL for generating user input signals for switching between photographing modes, such as a still image capturing mode and a motion picture capturing mode, is arranged on a top surface of the body 200. Furthermore, a shutter release button SR that generates different user input signals according to whether the shutter release button SR is half pressed or fully pressed is arranged on the top surface of the body 200. Auto-focusing (AF) may be performed in response to an S1 switch-on state, that is, a state in which the shutter release button SR is half pressed, and an image may be captured in response to an S2 switch-on state, that is, a state in which the shutter release button SR is fully pressed. Furthermore, the body 200 may further include a button SMV for initiating motion picture capturing and a main switch SM.

Figure 2:
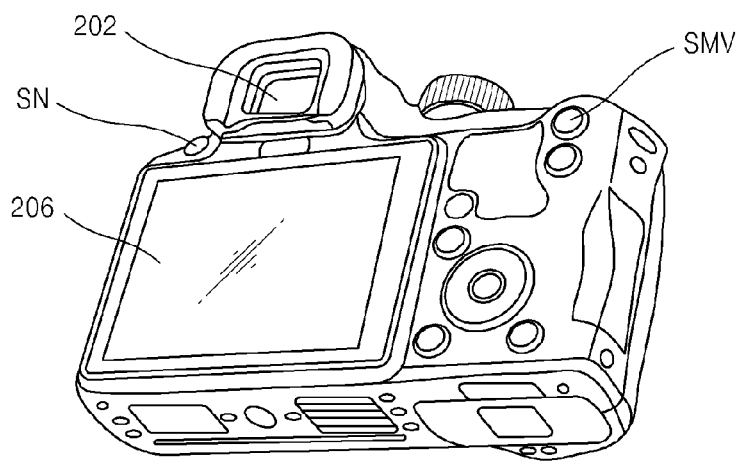
FIG. 2 is a rear view of the lens-exchangeable digital camera.

FIG. 2 is a rear view of the lens-exchangeable digital camera. Referring to FIGS. 1 and 2, a first display unit (LCD) 202 of a viewfinder (EVF) (not shown in FIGS. 1 and 2, but shown in FIG. 3 as element 201) that displays an image to be captured or information regarding a focus evaluation value during focus adjustment is arranged on a rear side of the digital camera. Furthermore, a second display unit 206 that displays a captured image and various information is also arranged on the rear side of the digital camera. Furthermore, a menu button SN for selecting operations of the lens-exchangeable digital camera is arranged on the rear side of the digital camera. Operations of the lens-exchangeable digital camera, such as operations for toggling display of information regarding the focus evaluation value, zooming an image to be captured during focus adjustment, and selecting modes for focus adjustment (such as a mode for adjusting focus based on multi-algorithms or a mode for adjusting focus based on a selected algorithm), may be selected and set up according to user input signals generated by the menu button SN.

Operations of the lens-exchangeable digital camera will be described below in detail. The lens-exchangeable digital camera is operated when the lens-exchangeable digital camera is turned on by rotating the main switch SM to an ON position. Although the camera is turned on by rotating the main switch SM in the current embodiment, the invention is not limited thereto, and the camera may be turned on by using any of various user operations, such as by pressing or touching the main switch SM.

The lens-exchangeable digital camera displays a live-view image. The live-view image may be displayed on the first display unit 202 of the EVF 201 or the second display unit 206. Furthermore, according to the current embodiment, focus aid (FA) information regarding a focusing state may further be displayed. Although the FA information is displayed as an image on the first display unit 202 of the EVF 201 and/or the second display unit 206 in the current embodiment, the invention is not limited thereto, and the FA information may be conveyed to a user in various forms, e.g., the FA information may be output as an audio signal. Preferably, the FA information may be displayed during the MF mode, in which a user manually controls focus adjustment.

Furthermore, when capturing a still image, while a live-view image is being displayed, if the shutter release button SR is half-pressed, that is, in the S1 switch-on state, Auto-focusing (AF) is performed. For MF adjustment, a user may perform MF adjustment by operating the focus ring.

On the other hand, when a user operates the zoom ring, a zoom lens group moves. Furthermore, when a user operates the focus ring, a position of a focus lens group is detected by a position detecting sensor, and a lens control circuit may change the position of the focus lens group based on the detection. In case of auto-focusing (AF), the focus ring may not be operated by a user (for example a photographer).

When a user fully presses the shutter release button S2, that is, in the S2 switch-on state, exposure is performed to capture a still image.

Figure 3:
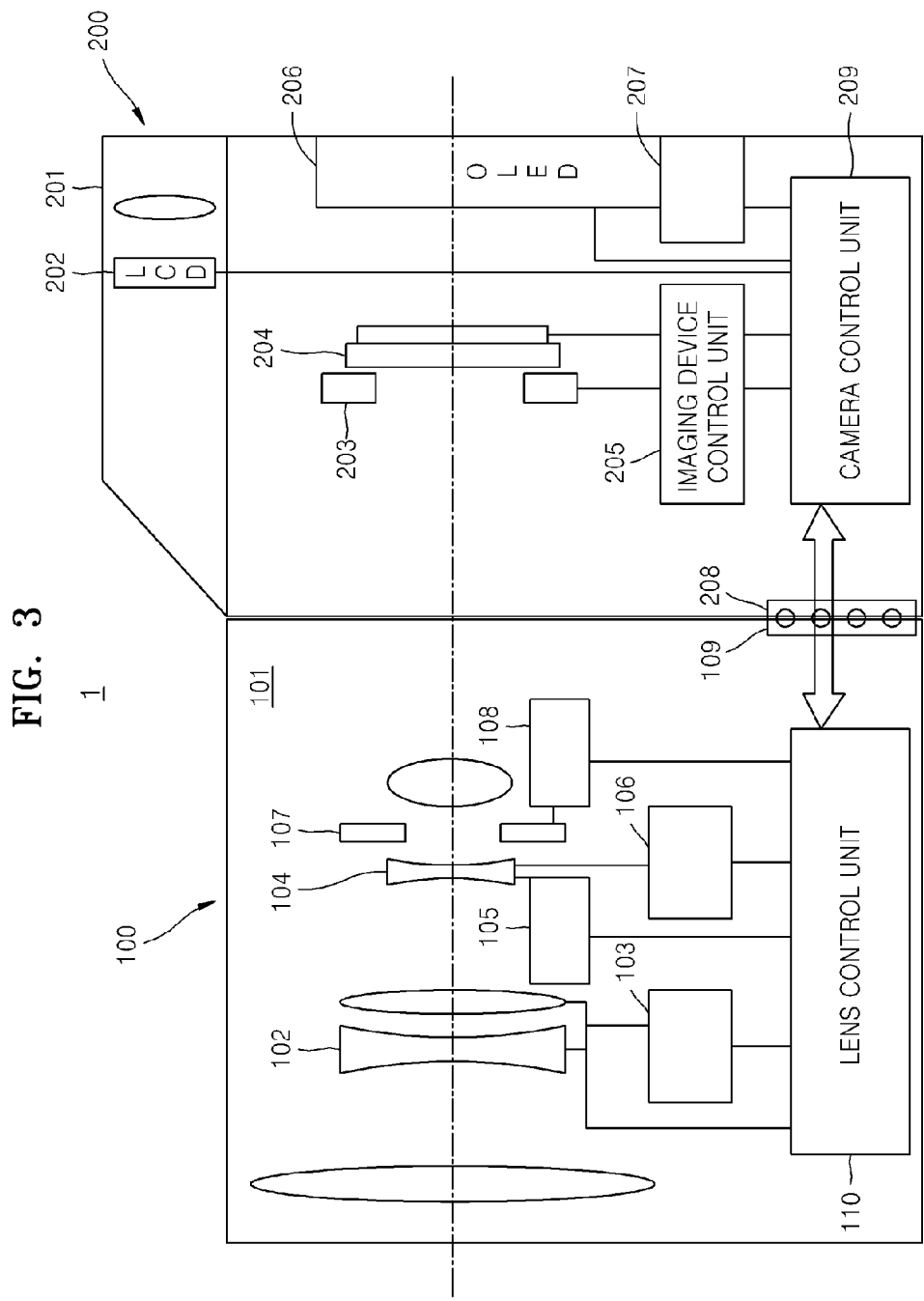
FIG. 3 is a block diagram for describing the lens-exchangeable digital camera shown in FIG. 1.

A still image acquired through exposure in the S2 switch-on state may be stored in a memory card, for example. Furthermore, the still image may be reproduced on the first display unit 202 of the EVF 201 and/or the second display unit 206. FIG. 3 is a block diagram for describing the lens-exchangeable digital camera shown in FIG. 1. According to the current embodiment, the lens-exchangeable digital camera is a lens-exchangeable digital camera 1 that includes the exchangeable lens 100 and the body 200. The exchangeable lens 100 has a focus detection function, and the body 200 is capable of driving a focus lens 104 of the exchangeable lens 100.

In detail, referring to FIG. 3, the exchangeable lens 100 includes an imaging optics 101 that includes a zoom lens 102 for zooming and the focus lens 104 for focusing, a zoom lens position detecting sensor 103, a focus lens driving unit 105, a focus lens position detection sensor 106, an aperture 107, an aperture driving unit 108, a lens control unit 110, and a lens mount 109.

Each of the zoom lens 102 and the focus lens 104 may be formed as lens groups including a plurality of lenses.

The zoom lens position detecting sensor 103 and the focus lens position detecting sensor 106 detect positions of the zoom lens 102 and the focus lens 104, respectively. A timing for detecting a position of the focus lens 104 may be set up between the lens control unit 110 and/or a camera control unit 209 that will be described below. For example, the timing for detecting a position of the focus lens 104 may be a timing for performing focus detection using image signals.

The focus lens driving unit 105 and the aperture driving unit 108 may be controlled by the lens control unit 110 to drive the focus lens 104 and the aperture 107, respectively. Especially, the focus lens driving unit 105 drives the focus lens 104 in an optical axis direction.

The lens control unit 110 transmits information regarding a detected position of the focus lens 104 to the body 200. If there is a change in a position of the focus lens 104 or the camera control unit 209 requests information regarding a position of the focus lens 104, the lens control unit 110 may transmit information regarding a detected position of the focus lens 104 to the body 200.

The lens mount 109 includes a lens-side communication pin that may be connected to a camera-side communication pin that will be described below and that may be used as a path for transmitting data and control signals.

Next, a configuration of the body 200 will be described.

The body 200 may include the EVF 201, a shutter 203, an imaging device 204, an imaging device control unit 205, the second display unit 206, an operating console 207, the camera control unit 209, and a camera mount 208.

The EVF 201 is an electronic viewfinder including the first display unit 202, which is an LCD device, and may display an image to be captured in real-time.

The shutter 203 determines a period of time for applying light to the imaging device 204, that is, an exposure time.

The imaging device 204 captures image light that has passed through the imaging optics 101 of the exchangeable lens 100 and generates image signals therefrom. The imaging device 204 may include a plurality of photoelectric converting units arranged in a matrix form and horizontal and/or vertical transmission paths for detecting image signals by moving charges from the photoelectric converting units. The imaging device 204 may include a charge-coupled device (CCD) sensor, a complementary metal-oxide semiconductor (CMOS) sensor, or the like.

The imaging device control unit 205 generates a timing signal and controls the imaging device 204 to capture an image in synchronization with the timing signal. Furthermore, the imaging device control unit 205 sequentially detects horizontal image signals after charges are accumulated in each of scan lines.

Various images and information are displayed on the second display unit 206. Although the second display unit 206 is an OLED device in the current embodiment, the invention is not limited thereto, and any of various display devices including an LCD device may be used as the second display unit 206.

The manipulation unit 207 is a unit via which a user inputs various instructions for operating the lens-exchangeable digital camera 1. The manipulation unit 207 may include various buttons, such as a shutter release button, a main switch, a mode dial, a menu button, or the like. Although members including buttons and dials are used in the current embodiment, the invention is not limited thereto, and a touch panel installed inside and outside of a display unit may be alternatively arranged.

The camera control unit 209 acquires a focus evaluation value through focus detection with respect to an image signal generated by the imaging device 204. Furthermore, the camera control unit 209 stores focus evaluation values corresponding to each of focus detection time points corresponding to timing signals generated by the imaging device control unit 205 and calculates an in-focus position by using information regarding a position of the focus lens 104 transmitted from the exchangeable lens 100 and the stored focus evaluation values. A result of calculating an in-focus position is transmitted to the exchangeable lens 100. The camera mount 208 includes the camera-side communication pin.

Hereinafter, operations of the exchangeable lens 100 and the body 200 will be briefly described.

When photographing an object, operations of the lens-exchangeable digital camera 1 are initiated by operating the main switch included in the manipulation unit 207. The lens-exchangeable digital camera 1 first performs live-view display as described below.

Image light of the object passes through the imaging optics 101 and is incident on the imaging device 204. Here, the shutter 203 is open. The imaging device 204 converts the incident image light into electric signals and generates image signals therefrom. The imaging device 204 operates according to a timing signal generated by the imaging device control unit 205. The generated image signals are converted to displayable data by the camera control unit 209 and the displayable data is displayed on the first display unit 202 of the EVF 201 and the second display unit 206. The series of steps stated above constitute a live-view display operation, whereby live-view images may be successively displayed as a motion picture.

After the live-view display is performed, when the shutter release button, which is a portion of the manipulation unit 207, is half-pressed, the lens-exchangeable digital camera 1 performs auto-focusing (AF). Auto-focusing (AF) is performed by using image signals generated by the imaging device 204, where, according to a contrast Auto-focusing (AF), a position of the focus lens 104 is calculated based on a focus evaluation value corresponding to a contrast value, and the focus lens 104 is driven according to the detected position of the focus lens 104. The focus evaluation value is acquired by the camera control unit 209. The camera control unit 209 calculates information for controlling the focus lens 104 based on the focus evaluation value and transmits the calculated information to the lens control unit 110 via the communication pins arranged in the lens mount 109 and the camera mount 208.

The lens control unit 110 controls the focus lens driving unit 105 according to the received information, and the focus lens driving unit 105 performs the Auto-focusing (AF) by driving the focus lens 104 in the optical axis direction. The focus lens position detecting sensor 106 monitors a position of the focus lens 104 and is fed back to the body 200.

If the zoom lens 102 is operated by a user, the zoom lens position detecting sensor 103 detects a position of the zoom lens 102, and the detected position of the zoom lens 102 may be used by the lens control unit 110 for auto-focusing (AF) with respect to the focus lens 104 or for other operations.

In an in-focus state, in which an object image is correctly focused, the lens-exchangeable digital camera 1 is entered into the S2 switch-on state by fully pressing the shutter release button, and the lens-exchangeable digital camera 1 performs exposure. Here, the camera control unit 209 first opens the shutter 203 completely and transmit photometric information acquired thereby as aperture control information to the lens control unit 110. The lens control unit 110 controls the aperture driving unit 108 based on the aperture control information to adjust the aperture 107. The camera control unit 209 controls the shutter 203 based on the photometric information and captures an object image by opening the shutter 203 for an appropriate exposure time.

A captured image is signal-processed, is compressed, and is stored in a memory card. Furthermore, the capture image may be displayed on the first display unit 202 of the EVF 201 and the second display unit 206. The operation of displaying a captured image immediately after the image is captured, which is a different operation from an operation of reproducing the captured image in a playback mode, is referred to as a 'quick-view mode,' and an image displayed in the quick-view mode is referred to as a quick-view image.

Figure 4:
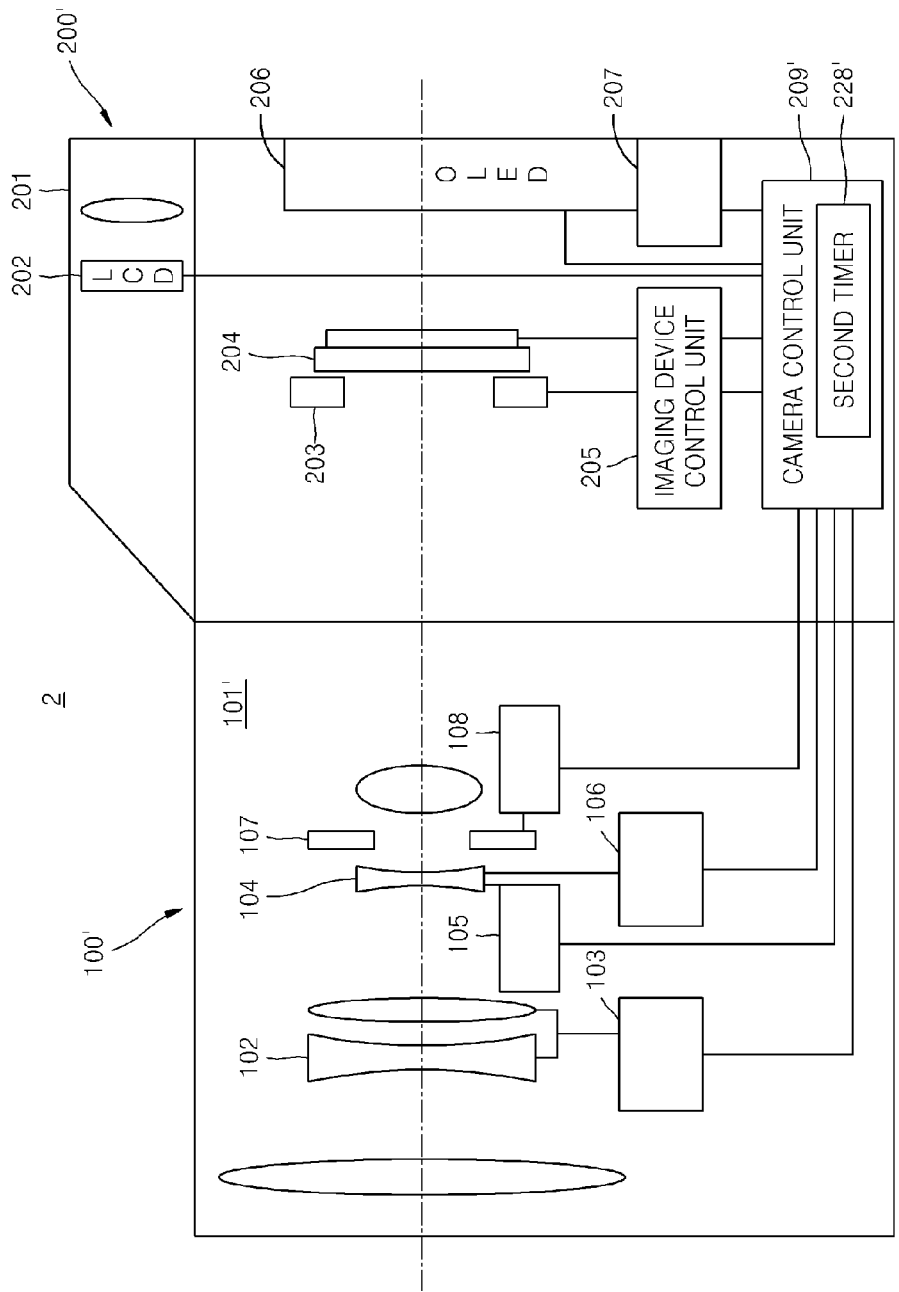
FIG. 4 is a block diagram of a compact digital camera as another embodiment of the focusing apparatus according to the invention.

FIG. 4 is a block diagram of a compact digital camera as another embodiment of the focusing apparatus according to the invention. Here, the compact digital camera refers to a digital camera in which a lens is fixed to the digital camera and may not be exchanged. The current embodiment provides a digital camera with a lens that may not be detached, compared to the lens-exchangeable digital camera shown in FIG. 3. Descriptions of the current embodiment will focus on differences between the compact digital camera of the current embodiment and the lens-exchangeable digital camera 1 of FIG. 3.

Referring to FIG. 4, the compact digital camera 2 includes a lens 100' and a body 200', wherein the lens 100' is non-exchangeable. Furthermore, since the lens 100' and the body 200' are integrated as a single body, the compact digital camera 2 does not include the lens mount 109 and the camera mount 208. Therefore, a camera control unit 209' directly controls a lens driving unit 105' (unmarked) and the aperture control unit 108. In the current embodiment, the lens driving unit 105' may drive the imaging optics 101 according to controls of the camera control unit 209'. The imaging optics 101 may include the zoom lens 102 and the focus lens 104. Furthermore, the aperture driving unit 108 may also drive the aperture 107 according to controls of the camera control unit 209'. Furthermore, the camera control unit 209' directly receives position information from the zoom lens position detecting sensor 103 and the focus lens position detecting sensor 106. In other words, in the current embodiment, the camera control unit 209 also functions as the lens control unit 110 shown in FIG. 3. Furthermore, in the current embodiment, a second timer 228' may be used to synchronize a focus evaluation value and a position of a lens.

[Control Circuit and Operations of Camera]

Figure 5:
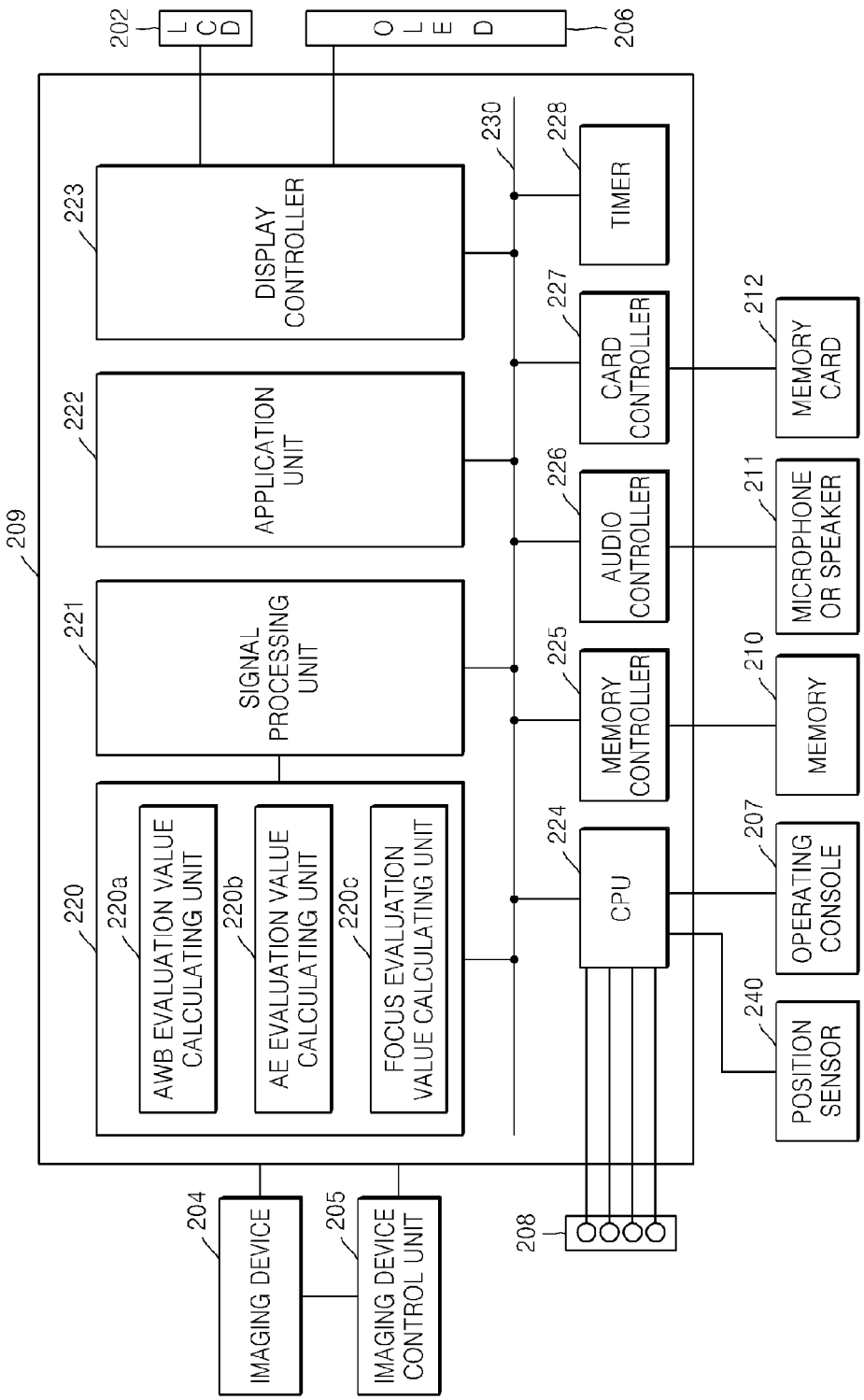
FIG. 5 is a block diagram for describing a camera control unit of the lens-exchangeable digital camera shown in FIG. 3 in detail.

FIG. 5 is a block diagram for describing the camera control unit 209 of the lens-exchangeable digital camera 1 shown in FIG. 3 in detail. Although the camera control unit 209 of the lens-exchangeable digital camera 1 shown in FIG. 3 is shown in the current embodiment, descriptions of the current embodiment are not limited thereto, and the descriptions of the current embodiment may also be applied to the camera control unit 209' of the compact digital camera 2 shown in FIG. 4. Here, the camera control unit 209' shown in FIG. 4 includes the lens control unit 110.

Referring to FIG. 5, the camera control unit 209 may include a pre-processing unit 220, a signal processing unit 221, an application unit 222, a display controller 223, a CPU 224, a memory controller 225, an audio controller 226, a card controller 227, a timer 228, and a main bus 230.

The camera control unit 209 transmits various instructions and data to each of components via the main bus 230.

The pre-processing unit 220 includes an auto white balance (AWB) evaluation value calculating unit 220a that receives an image signal generated by the imaging device 204 and calculates an AWB evaluation value for adjusting white balance, an auto exposure (AE) evaluation value calculating unit 220b that calculates an AE evaluation value for exposure adjustment, and a focus evaluation value calculating unit 220c that calculates a focus evaluation value for focusing. A focus evaluation value may include a horizontal evaluation value indicating contrast in a horizontal direction. The horizontal evaluation value is calculated by directly receiving horizontal image signals read out from the imaging device 204.

The signal processing unit 221 generates a live-view image or a captured image that may be displayed on the first display unit 202 by performing a series of image signal processes, such as gamma correction.

The application unit 222 performs face detection using image signals on which the image signal processes are performed. Furthermore, the application unit 222 performs compression and decompression on image signals after the image signal processes are performed thereto. For example, the application unit 222 compresses image signals into a compression format, such as JPEG compression format or H.264 compression format. An image file including image data generated by performing the compression is stored in a memory card 212.

The display controller 223 controls image output to the first display unit 202 of the EVF 201 or the second display unit 206.

The CPU 224 controls overall operations of each of the components. According to the compact digital camera 2 shown in FIG. 4, the CPU 224 performs communication with the lens control unit 110.

The memory controller 225 controls a memory 210 for temporarily storing a captured image or calculation data, and the audio controller 226 controls a microphone or speaker 211. Furthermore, the card controller 227 controls the memory card 212 for storing a captured image.

The timer 228 measures time. Hereinafter, operations of the camera control unit 209 will be briefly described.

When an operation signal is input to the CPU 224 from the manipulation unit 207, the CPU 224 operates the imaging device control unit 205. The imaging device control unit 205 operates the imaging device 204 by outputting a timing signal. When an image signal is input to the pre-processing unit 220 from the imaging device 204, calculations for AWB and AE are performed. Results of the calculations for AWB and AE are fed back to the imaging device control unit 205, so that an image signal with a suitable color output and a suitable exposure may be acquired from the imaging device 204.

Meanwhile, after the lens-exchangeable digital camera 1 starts operations and live-view display is performed, the camera control unit 209 inputs an image signal captured at a suitable exposure to the pre-processing unit 220 and calculates an AE evaluation value, an AWB evaluation value, and a focus evaluation value. An image signal for live-view display may be directly input to the signal processing unit 221 instead of via the main bus 230, and image signal processes, such as pixel interpolation, may be performed thereon. An image signal, on which image signal processes are performed, is transmitted through the main bus 230 and the display controller 223 and is displayed on the first display unit 202 of the EVF 201 and the second display unit 206. A live-view display may be updated at a rate of 60 frames per second (fps). However, the current invention is not limited thereto, and a live-view display may be updated at any of various rates, such as 120 fps, 180 fps, and 240 fps. The update rate is set by the CPU 224 based on a result of photometry and AF conditions and may be adjusted according to a timing signal generated by the imaging device control unit 205.

When the shutter release button is half-pressed, the CPU 224 detects an S1 signal corresponding to the half-pressed shutter release button and instructs the lens control unit 110 via the communication pins arranged on the camera mount 208 and the lens mount 109 to start driving the focus lens 104 for Auto-focusing (AF). Alternatively, the CPU 224 controls driving of the focus lens 104 for Auto-focusing (AF) when the S1 signal corresponding to the half-pressed shutter release button is detected. In other words, the CPU 224 may be a main control unit.

Furthermore, the CPU 224 acquires an image signal from the imaging device 204, and the focus evaluation value calculating unit 220c of the pre-processing unit 220 calculates a focus evaluation value. A focus evaluation value is calculated according to movement of the focus lens 104. A position of the focus lens 104 corresponding to the maximum contrast of an object image is detected based on changes of focus evaluation values, and the focus lens 104 is moved to the detected position. For example, the detected position of the focus lens 104 may be a position corresponding to the maximum focus evaluation value. The series of steps stated above constitutes an Auto-focusing (AF), where live-view display may be continuously performed during the Auto-focusing (AF). An image signal used for a live-view image and an image signal used for calculation of a focus evaluation value may be the same image signal.

According to the invention, a direction in which the focus lens 104 is to be driven, that is, a target drive direction, is quickly determined during the Auto-focusing (AF). Hereinafter, detailed descriptions of the CPU 224 will be given.

Figure 6:
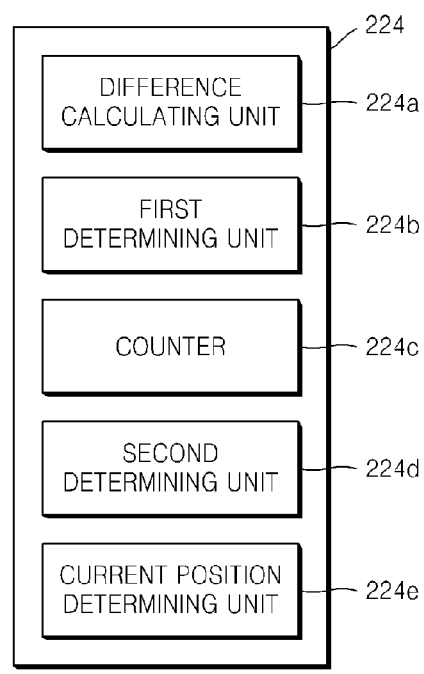
FIG. 6 is a block diagram for describing a CPU of the camera control unit as shown in FIG. 5.

FIG. 6 is a block diagram for describing the CPU 224 of the camera control unit 209 as shown in FIG. 5.

Referring to FIG. 6, the CPU 224 calculates differences between focus evaluation values calculated by the focus evaluation value calculating unit 220c of FIG. 5. For example, the CPU 224 calculates a difference between a current focus evaluation value and a previous focus evaluation value.

Furthermore, the CPU 224 includes a first determining unit 224b that compares the calculated difference to a threshold value.

A result of comparing the calculated difference and the threshold value may be counted by a counter 224c, and thus count information is generated. The threshold value may include a plurality of values, and results of comparing the calculated difference to each of the plurality of threshold values may be counted. For example, first count information may be generated, and may count a result of comparing the calculated difference to a first threshold value by being increased or decreased by a predetermined degree or amount according to the comparison result. In other words, the first count information regarding the result of comparing the calculated difference to the first threshold value, which may include a plurality of threshold values, may be generated. The counter 224c may generate second count information regarding a result of comparing the calculated difference to a second threshold value. For example, the second count information may be increased or decreased by a predetermined degree according to the comparison result. A second determining unit 224d may compare the count information generated as described above to threshold count information and determine a target drive direction of the focus lens 104. For example, the second determining unit 224d may compare at least one of the first count information, the second count information, and a sum thereof to the threshold count information and determine a target drive direction of the focus lens 104. The threshold count information may differ according to a threshold value. The threshold count information may have a smaller value as the threshold value becomes larger. For example, the threshold count information may be set as shown in Table 1 below.

TABLE 1

| Threshold value (Thr) | Threshold count Information (count) |
|---|---|
| Current Focus Evaluation Value/B (thr_h) | 0 (count_h) |
| Current Focus Evaluation Value/A (thr_l) | 3 (count_h) |

Here, A is greater than B.

As shown in Table 1 above, the first threshold count information may be set to be 0 in correspondence to the first threshold value when the first threshold value is relatively large. Therefore, in the case where the focus lens 104 is driven to a near side and the calculated difference is greater in magnitude than the first threshold value or in the case where the focus lens 104 is driven to a far side and the calculated difference is smaller in magnitude than the first threshold value, the first count information may be increased by 1, and thus the first count information may be incremented by 1. Therefore, if the first count information is greater in magnitude than the threshold count information, which is 0, a target drive direction may be determined immediately without additional determination. Therefore, a target drive direction may be determined based on a current focus evaluation value without further driving the focus lens 104.

Furthermore, in Table 1 above, a threshold value is variable and is set according to a current focus evaluation value. However, the invention is not limited thereto, and the threshold value may be set to have a fixed value, such as 7 or 5.

Furthermore, the second determining unit 224*d* may determine that a target drive direction is a first target drive direction corresponding to the first count information, when the first count information is greater in magnitude than the first threshold count information corresponding to the first threshold value. Alternatively, if the first count information is not greater in magnitude than the threshold count information corresponding to the first threshold value, the second determining unit 224*d* may determine that the target drive direction is a second target drive direction opposite to the first target drive direction. Alternatively, the second determining unit 224*d* may determine that the target drive direction is the first target drive direction when the second count information is greater in magnitude than the second threshold count information corresponding to the second threshold value. Alternatively, if the second count information is not greater in magnitude than the second threshold count information corresponding to the second threshold value, the second determining unit 224*d* may determine that the target drive direction is the second target drive direction.

Furthermore, the CPU 224 may further include a current position determining unit 224*e* that determines a current position of the focus lens 104. Furthermore, if a current position of the focus lens 104 is at the near side, the focus lens driving unit 105 may drive the focus lens 104 in a direction toward the far side. If a current position of the focus lens 104 is at the far side, the focus lens driving unit 105 may drive the focus lens 104 in a direction toward the near side. The focus evaluation value calculating unit 220*c* calculates a focus evaluation value by fine-driving the focus lens 104 in either the direction toward the far side or the direction toward the near side. Next, differences between focus evaluation values may be calculated by a difference calculating unit 224*a*. Therefore, the focus lens 104 is driven in the direction toward the far side or the direction toward the near side based on a result of determination of the current position determining unit 224*e* to determine a final target drive direction.

The counter 224*c* may generate the first count information and/or the second count information, which represent in a state of increase (s) or decrease(s) of the focus evaluation value, according to a direction in which the focus lens 104 is currently driven. In detail, if the focus lens 104 is driven in a direction toward the near side and the calculated difference is greater in magnitude than the first threshold value, the counter 224*c* may count a result of comparing the calculated difference and the first threshold value by increasing the first count information by a predetermined degree. If the focus lens 104 is driven in a direction toward the near side and the calculated difference is smaller in magnitude than the first threshold value, the counter 224*c* may count a result of comparing the calculated difference and the first threshold value by decreasing the first count information decreases by the predetermined degree. Furthermore, if the focus lens 104 is driven in a direction toward the far side and the calculated difference is greater in magnitude than the first threshold value, the counter 224*c* may count a result of comparing the calculated difference and the first threshold value by decreasing the first count information decreases by the predetermined degree. If the focus lens 104 is driven in a direction toward the far side and the calculated difference is smaller in magnitude than the first threshold value, the counter 224*c* may count a result of comparing the calculated difference and the first threshold value by increasing the first count information increases by the predetermined degree. In the same regard, if the focus lens 104 is driven in a direction toward the near side and the calculated difference is greater in magnitude than the second threshold value, the counter 224*c* may count a result of comparing the calculated difference and the second threshold value by increasing the second count information increases by a predetermined degree. If the focus lens 104 is driven in a direction toward the near side and the calculated difference is smaller in magnitude than the second threshold value, the counter 224*c* may count a result of comparing the calculated difference and the second threshold value by decreasing the second count information decreases by the predetermined degree. Furthermore, if the focus lens 104 is driven in a direction toward the far side and the calculated difference is greater in magnitude than the second threshold value, the counter 224*c* may count a result of comparing the calculated difference and the second threshold value by decreasing the second count information by the predetermined degree. If the focus lens 104 is driven in a direction toward the far side and the calculated difference is smaller in magnitude than the second threshold value, the counter 224*c* may count a result of comparing the calculated difference and the second threshold value by increasing the second count information increases by the predetermined degree.

If count information satisfies corresponding threshold count information, e.g., the count information is greater in magnitude than the corresponding threshold count information, the second determining unit 224*d* may determine a target drive direction of the focus lens 104 according to a polarity of the count information. For example, if the focus lens 104 is currently driven in a direction toward the far side, the value of the first count information is −1 and the value of the first threshold count information is 0, the first count information is greater in magnitude than the first threshold count information, and thus it may be determined that the first count information satisfies the first threshold count information. Furthermore, if the value of the second threshold count information is 3 and the value of the second count information is 2, the second count information is smaller in magnitude than the second threshold count information and thus the second count information does not satisfy the second threshold count information. However, since the first count information satisfies the first threshold count information, a direction corresponding to the negative polarity of the first count information, for example, a direction toward the far side, is a target drive direction.

Figure 7:
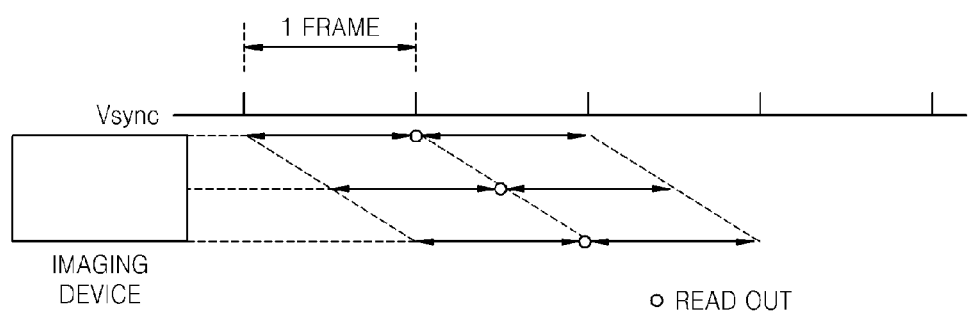
FIG. 7 is a diagram for describing outputting of image signals from an imaging device.

In the invention, a CMOS sensor may be arranged as an imaging device, and exposure of one field may be read out in a rolling shutter method. Here, if the rolling shutter method is used, a frame rate is 60 fps, and a shutter speed is ⅟60 per sec, a time lag may occur between an image signal read out earlier and an image signal read out later, as shown in FIG. 7, while image signals are read out from an imaging device. For example, a 1 VD delay may occur.

If a time lag occurs between an image signal corresponding to an upper portion of a field image and an image signal corresponding to a lower portion of the same as described above, embodiments of the invention are described using comparative embodiments, respectively.

Figure 8:
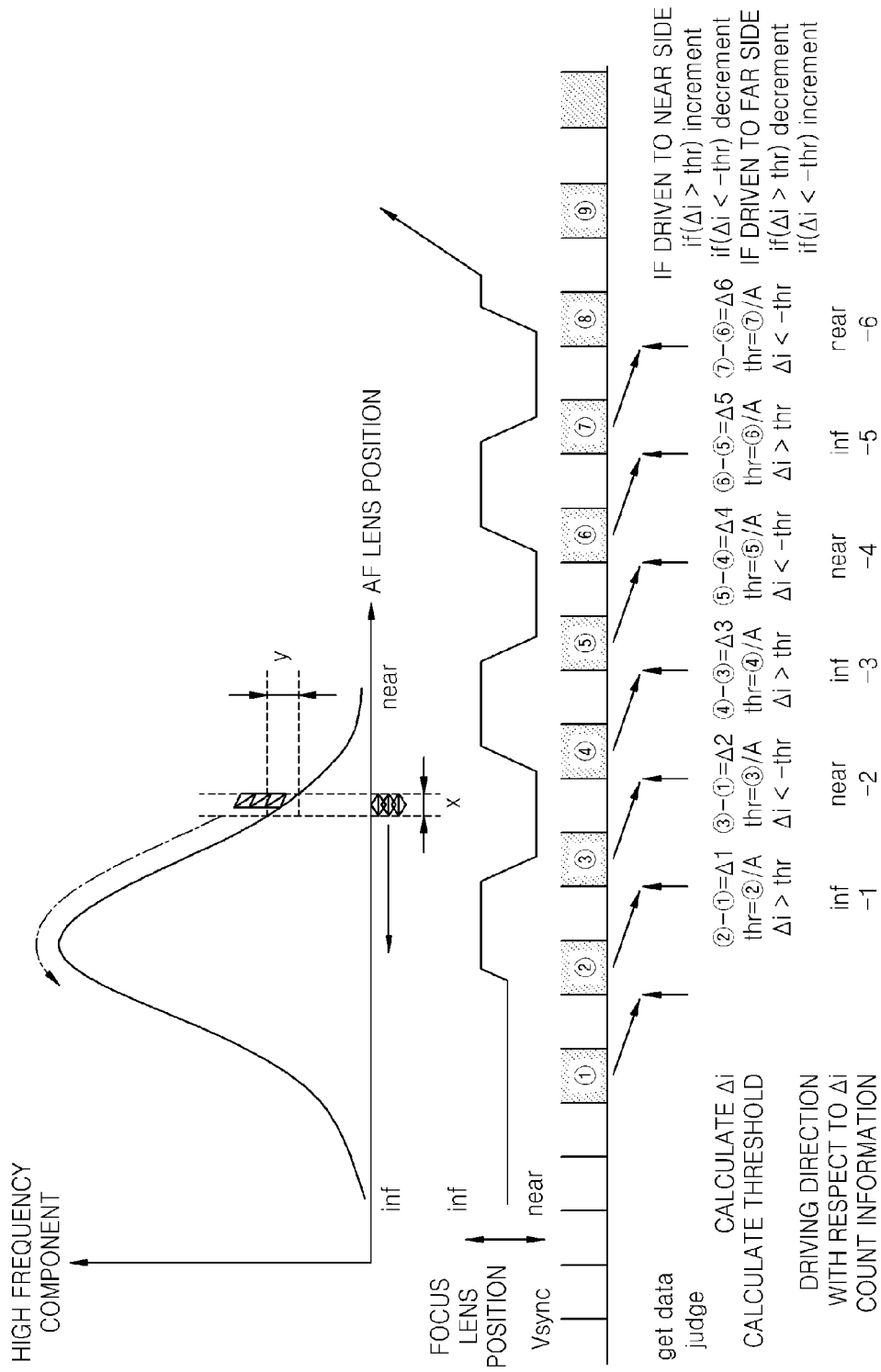
FIG. 8 is a diagram for describing methods of adjusting focus by using a focusing apparatus according to an embodiment of the invention.
Figure 9:
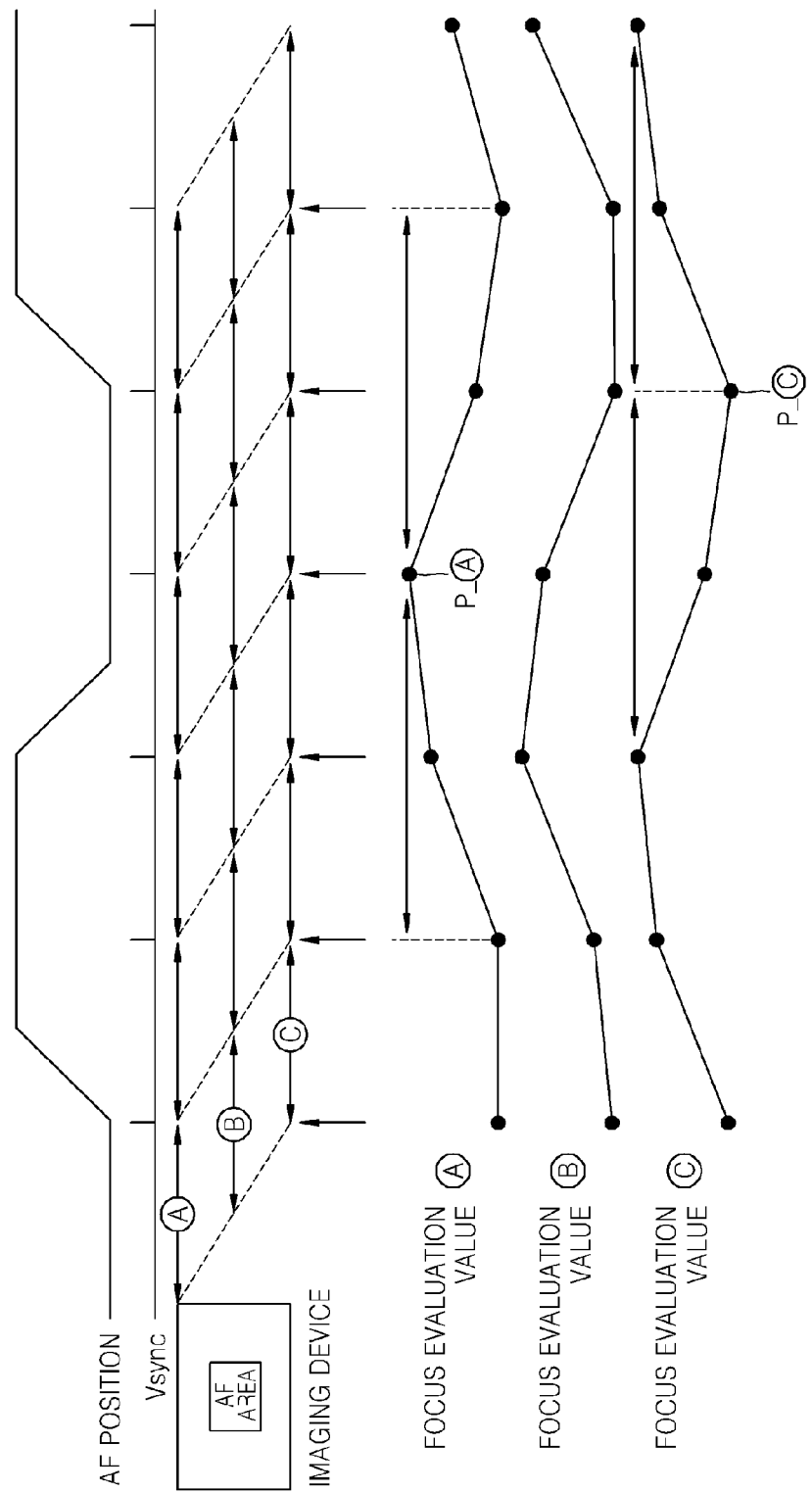
FIG. 9 is a diagram for describing methods of adjusting focus by using a focusing apparatus according to a comparative embodiment.
Figure 10:
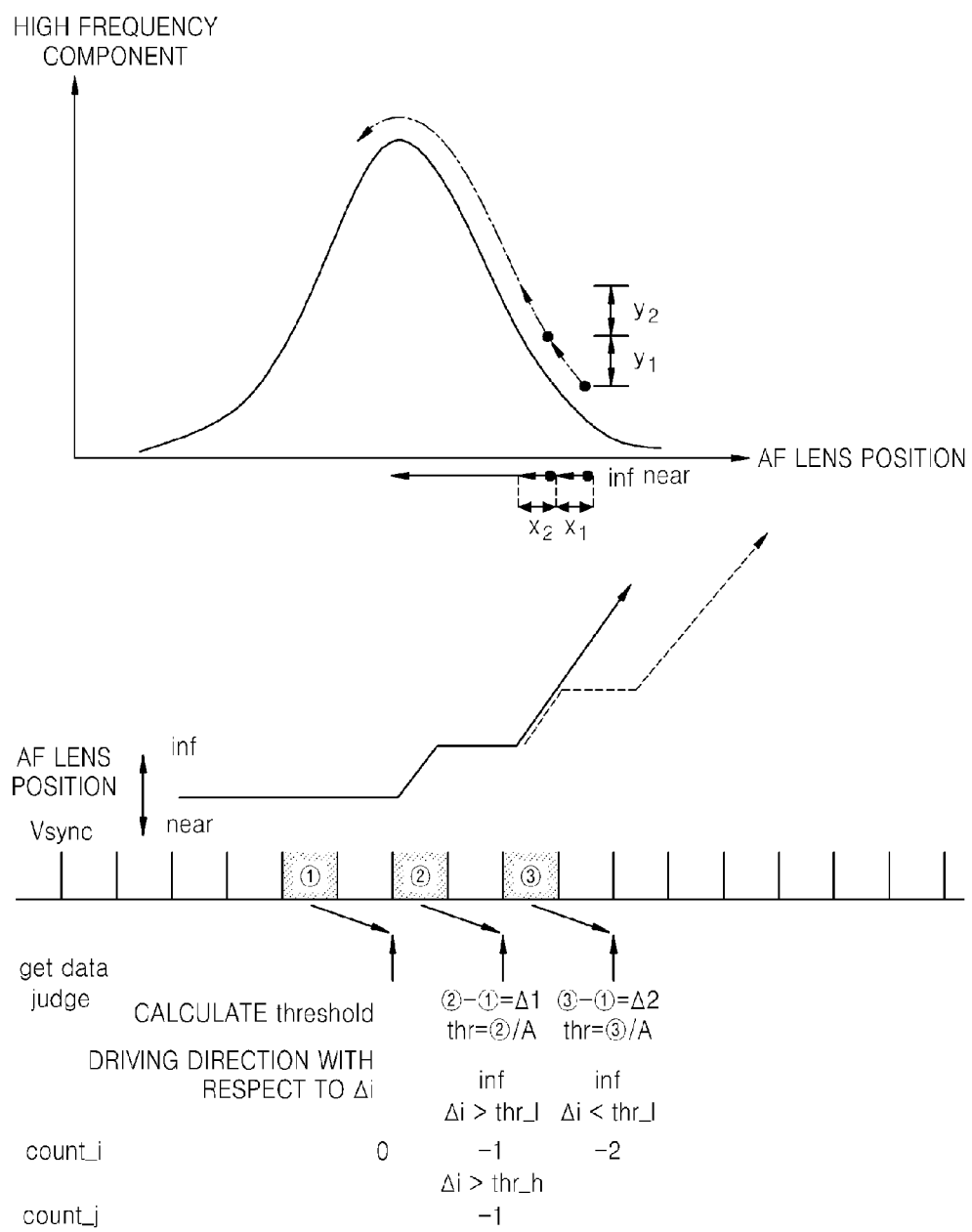
FIGS. 10 and 11 are diagrams for describing a method of adjusting focus by using a focusing apparatus according to an embodiment of the invention.
Figure 11:
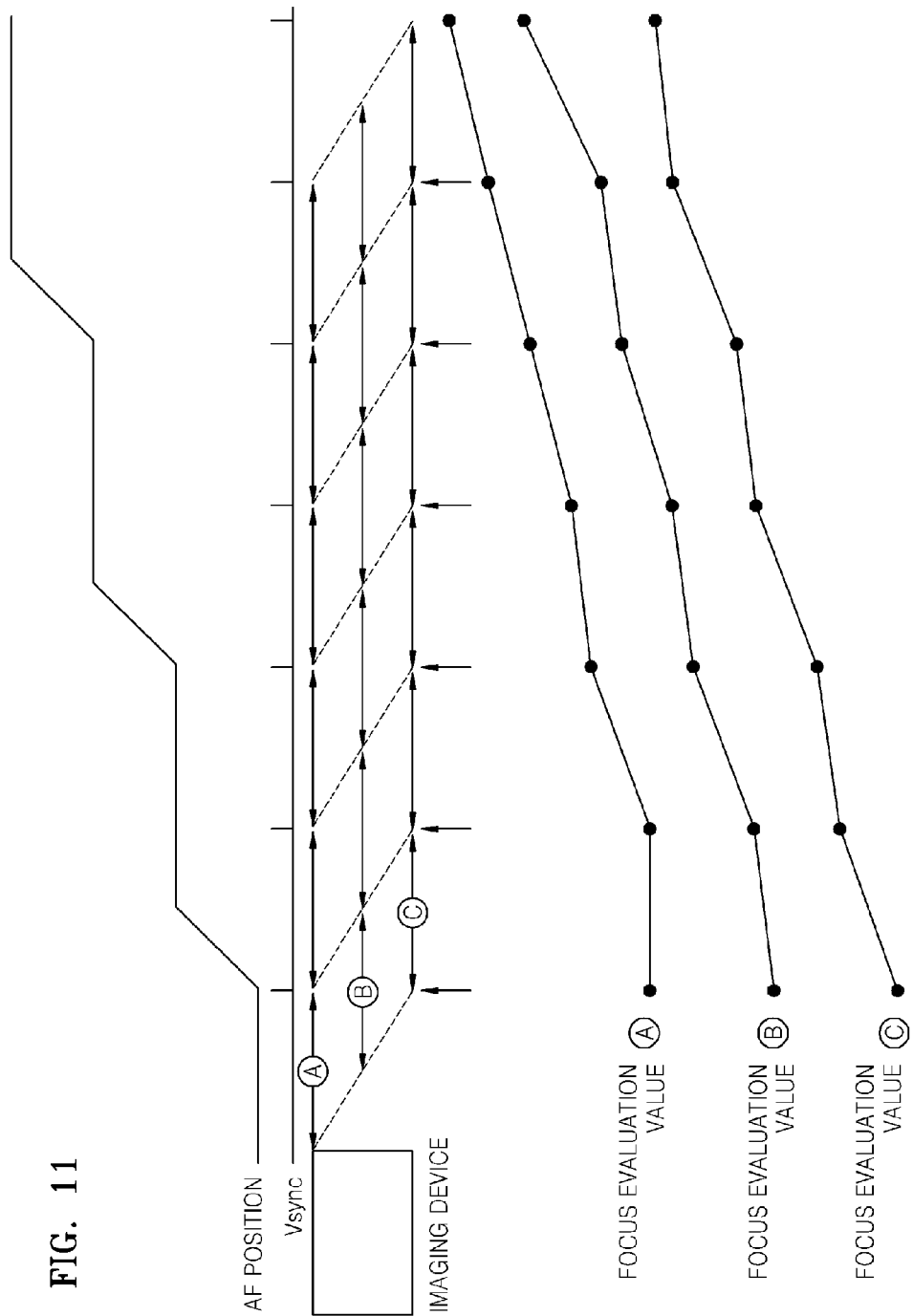

FIG. 8 is a diagram for describing methods of adjusting focus by using a focusing apparatus according to an embodiment of the invention and FIG. 9 is a diagram for describing methods of adjusting focus by using a focusing apparatus according to a comparative embodiment, respectively. FIGS. 10 and 11 are diagrams for describing a method of adjusting focus by using a focusing apparatus according to an embodiment of the invention.

First, referring to FIG. 8, a focus lens is currently at a near side and reciprocates on a 2V cycle. Here, V indicates a unit of a horizontal synchronization signal. Therefore, the focus lens reciprocates between a current position of the focus lens and a position 2V apart from the current position of the focus lens toward a far side. The reciprocation may be confirmed from a position of an Focus lens (a position of Focus lens is described under a graph in FIG. 8.

Meanwhile, an image signal is read out from an imaging device according to a vertical synchronization signal Vsync, and a focus evaluation value corresponding to a sum of high frequency components is calculated from the read out image signal. A first focus evaluation value ① is calculated using a first image signal, and a second focus evaluation value ② is calculated using a second image signal read out at a time after 2V from a time of reading out the first image signal while the focus lens is driven in a direction toward the far side. The second image signal may be read out after the first image signal according to a driving unit of the focus lens.

Furthermore, a first difference Δ1 between the first focus evaluation value ① and the second focus evaluation value ② is calculated. Here, a threshold value thr may be a value acquired by dividing the second focus evaluation value by A. Next, if the first difference Δ1 is greater in magnitude than the threshold value thr, it may be determined that a value of count information is increased and the focus lens is driven in a direction toward the far side.

When the focus lens is driven in a direction toward the far side, it may be determined that a value of count information is increased if a difference is greater in magnitude than a threshold value, whereas it may be determined that a value of count information is decreased if a difference is smaller in magnitude than a threshold value. When the focus lens is driven in a direction toward the near side, it may be determined that a value of count information decreases if a difference is greater in magnitude than a threshold value, whereas it may be determined that a value of count information increases if a difference is smaller in magnitude than a threshold value. If count information increases, the count information may decrease by 1. If count information decreases, the count information may increase by 1. In FIG. 8, the count information acquired by six reciprocations may be −6, and if the count information satisfies threshold count information, a direction toward the far side or the near side may be determined as the final target drive direction according to the polarity of the count information. In the current embodiment, the threshold count information is 5 and the count information is negative, and thus the final target drive direction may be the direction toward the far side.

In detail, according to the comparative embodiment, focus evaluation values (a focus evaluation value ⓐ, a focus evaluation value ⓑ, and a focus evaluation value ⓒ) according to image signals read out in synchronization with a vertical synchronization signal Vsync in FIG. 9 are calculated. Here, peak values of the focus evaluation values have different phases P ¡ Ûa and P ⓒ. Therefore, a phase contrast occurs with respect to a vertical direction, and thus differences between the focus evaluation values become small. As a result, determining of a target drive direction of a focus lens may not be sufficiently precise. This may deteriorate reliability of Auto-focusing (AF).

On the contrary, according to the invention, as shown in FIG. 10, a focus evaluation value is calculated by fine-driving a focus lens in a direction by a unit of 2V. Furthermore, a first focus evaluation value ① and a second focus evaluation value ② may be acquired according to positions of the focus lens. In the current embodiment, at least two threshold values may be set. A value acquired by dividing a current focus evaluation value by B may be set as a first threshold value thr_h, and a value acquired by dividing the current focus evaluation value by A may be set as a second threshold value thr_l. Here, B is set to be smaller than A, and thus the first threshold value thr_h is greater than the second threshold value thr_l. Furthermore, in the current embodiment, the focus lens is constantly fine-driven in a direction, e.g., a direction toward the far side. Therefore, when a difference between the first focus evaluation value ① and the second focus evaluation value ① is greater in magnitude than the first threshold value thr_h, first count information count_h having a value of −1 is generated. Furthermore, if the difference is greater in magnitude than the second focus evaluation value thr_l, second count information count_l having a value of −1 is generated. In this regard, the first count information count_h and the second count information count_l are generated with respect to the difference. If generated count information satisfies corresponding threshold count information, a target drive direction of the focus lens may be determined with no further fine-driving of the focus lens. For example, if first threshold count information threshold_h is set to be 0, the first count information count_h, here having a value of −1, is greater in magnitude than the first threshold value thr_h for one time, that is, for a number of times greater than 0, and thus the first count information count_h satisfies the first threshold count information threshold_h. Therefore, a direction toward the far side may be determined as the final target drive direction based on the negative polarity of the first count information. Positive polarity may correspond to a direction toward the near side, and it may also be determined whether the second count information count_l satisfies second threshold count information threshold_l. Furthermore, it is determined whether the initial position of the focus lens is within a first region including the near side or a second region including the far side. If the initial position of the focus lens is within the first region, the focus lens may be fine-driven in a direction toward the far side. If the initial position of the focus lens is within the second region, the focus lens may be fine-driven in a direction toward the near side.

Furthermore, in the current embodiment, an example of determining a final target drive direction by using first count information and driving the focus lens in the target drive direction is indicated with a solid line, whereas an example of determining a final target drive direction by using second count information and driving the focus lens in the target drive direction is indicated with a dotted line.

Furthermore, referring to FIG. 11, phase contrast between focus evaluation values with respect to image signals read out in synchronization with a vertical synchronization signal may be prevented by fine-driving the focus lens in a direction. Therefore, a target drive direction of the focus lens may be set more precisely. As a result, a speed of calculating a final position of the focus lens, that is, an Auto-focusing (AF) speed, may be improved.

Figure 12A:
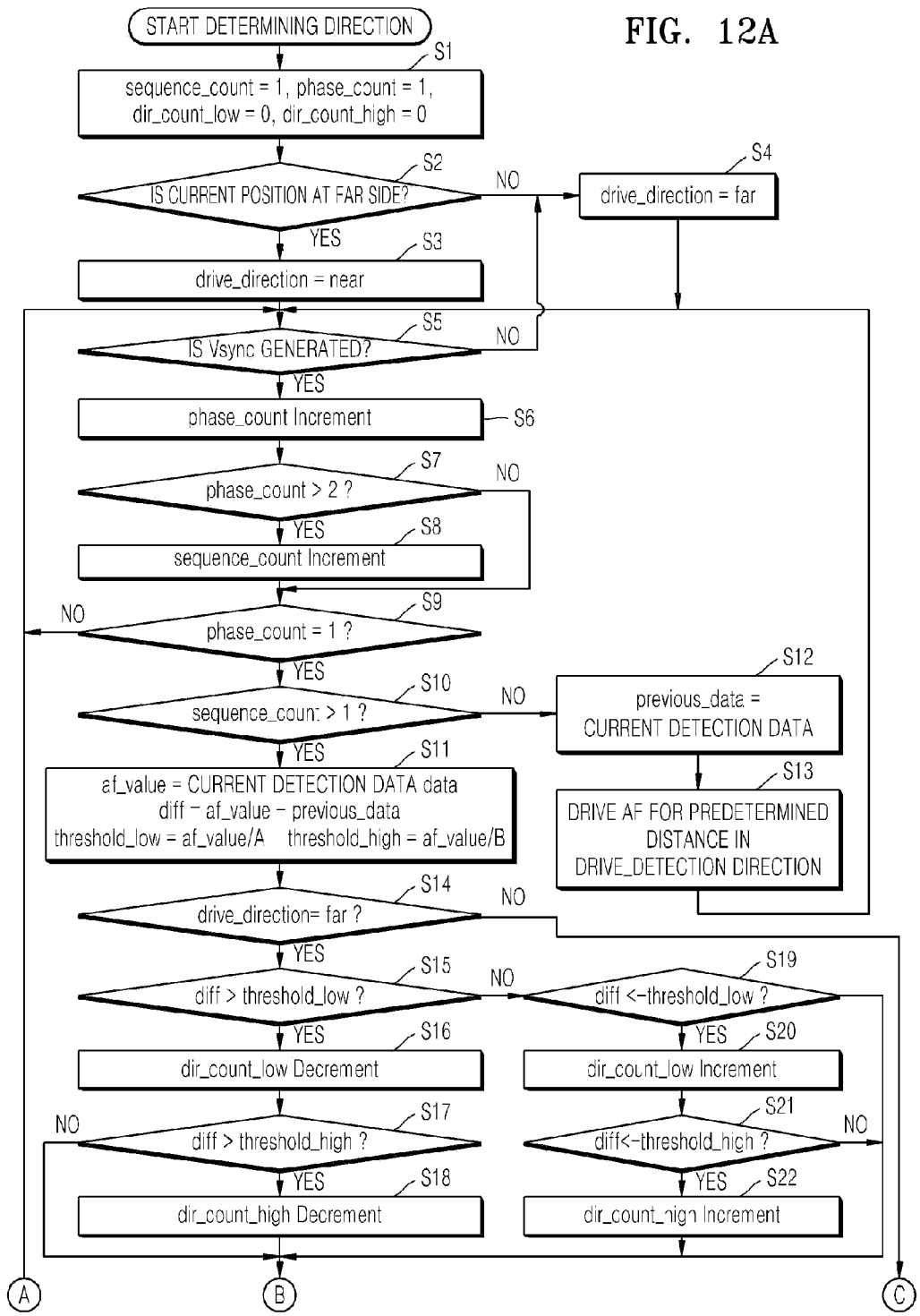
FIGS. 12A and 12B are flowcharts for describing a method that of adjusting focus in a focusing apparatus according to an embodiment of the invention.
Figure 12B:
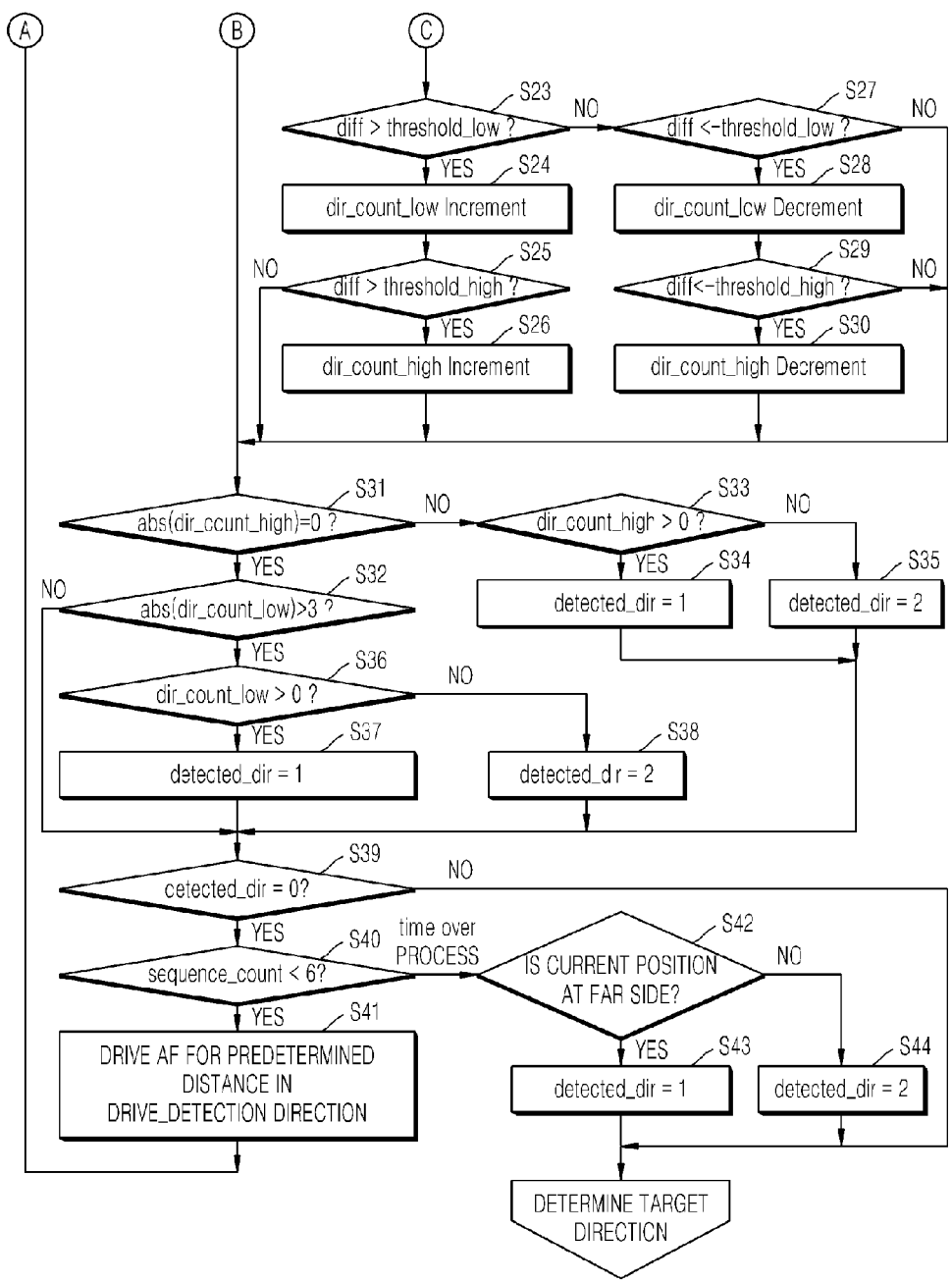

FIGS. 12A and 12B are flowcharts for describing a method that of adjusting focus in a focusing apparatus according to an embodiment of the invention.

Referring to FIGS. 12A and 12B, determination of a target drive direction for driving a focus lens for focus adjustment begins.

Initial values of sequence_count and phase_count are set to be 1. Furthermore, values of first count information dir_count_high and second count information dir_count_low are set to be 0. Furthermore, an initial value of the target drive direction detected_dir is set to be 0 (step S1).

It is determined whether a current position of the focus lens is close to a far side (step S2). In detail, it may be determined whether the current position of the focus lens is within a region including the far side. If the current position of the focus lens is within the region including the far side, the focus lens may be fine-driven in a direction toward a near side (step S3). If the current position of the focus lens is within a region including the near side, the focus lens may be fine-driven in a direction toward the far side (step S4). Here, the direction in which the focus lens is fine-driven is a drive direction for determining a target drive direction.

Next, it is determined whether a vertical synchronization signal Vsync is generated (step S5). If the vertical synchronization signal Vsync is not generated, the method proceeds back to the step S4. If the vertical synchronization signal Vsync is generated, phase_count is incremented (step S6). It is determined whether the value of phase_count is greater than 2 (step S7). If the value of phase_count is greater than 2, sequence_count is incremented, and the value of phase_count is set to be 1 (step S8). If the value of phase_count is not greater than 2 or after the value of phase_count is set to be 1, it is determined whether the value of phase_count is 1 (step S9). If the value of phase_count is not 1, the method proceeds back to the step S5. If the value of phase_count is 1, it is determined whether the value of sequence_count is greater than 1. If the value of sequence_count is greater than 1, a current focus evaluation value af_value is calculated, a value acquired by subtracting a previous focus evaluation value previous_data from the current focus evaluation value af_value, that is, a difference (diff=af_value−previous_data) is calculated, and a first threshold value (threshold_high=af_value /B) and a second threshold value (threshold_low=af_value /A) are set. Here, A is greater than B. Furthermore, the current focus evaluation value af_value is stored as the previous focus evaluation value (previous_data=af_value). Furthermore, although a value calculated by subtracting a previous focus evaluation value from a current focus evaluation value is used as the difference in the current embodiment, the invention is not limited thereto, and any of various values capable of indicating a difference between the focus evaluation values, such as the absolute value of the difference between the focus evaluation values. The difference may be basically a difference between focus evaluation values, and the threshold values may differ from each other.

If the value of sequence_count is not greater than 1, the current focus evaluation value af_value is used as the previous focus evaluation value previous_data (step S12). Furthermore, the focus lens is fine-driven in the same drive direction (step S13), and the method proceeds back to the step S5.

It is determined whether the focus lens is driven in a direction toward the far side (step S14). If the focus lens is driven in a direction toward the far side, it is determined whether a difference diff between focus evaluation values calculated by fine-driving the focus lens in the direction toward the far side is greater than the second threshold value threshold_low (step S15). If the difference is greater than the second threshold value threshold_low, the second count information dir_count_low is decremented (step S16). For example, the second count information dir_count_low may be decremented by 1. Next, it is determined whether the difference diff is greater than the first threshold value threshold_high (step S17). If the difference diff is greater than the first threshold value threshold_high, the first count information dir_count_high is also decremented (step S18). For example, the first count information dir_count_low may be decremented by 1. Since the first threshold value threshold_high is greater than the second threshold value threshold_low, determination is first made with respect to the second threshold value threshold_low, which is the smaller one of the two, in the current embodiment. If required, determination may be first made with respect to the first threshold value threshold_high, and, if the difference is greater than the first threshold value threshold_high, determination with respect to the second threshold value threshold_low may be omitted.

If the difference diff is not greater than the second threshold value threshold_low, it is determined whether the difference diff is smaller than negative second threshold value −threshold_low (step S19). If the difference diff is smaller than the negative second threshold value −threshold_low, the second count information dir_count_low is incremented (step S20). For example, the second count information dir_count_low may be incremented by 1 (+1). Next, it is determined whether the difference diff is smaller than negative first threshold value −threshold_high (step S21). If the difference diff is smaller than negative first threshold value −threshold_high, the first count information dir_count_high is also incremented (step S22). For example, the first count information dir_count_high may be incremented by 1 (+1).

Furthermore, if the difference diff is smaller than the first threshold value threshold_high, the first count information dir_count_high may not be decremented. Alternatively, although not shown in the current embodiment, the first count information dir_count_high may be incremented by 1 (+1).

Furthermore, in the steps S19 and 21, if the difference diff is not smaller than the negative second threshold value −threshold_low or the negative first threshold value −threshold_high, the second count information dir_count_low and the first count information dir_count_high may be decremented or incremented. Alternatively, the second count information dir_count_low and the first count information dir_count_high may be decremented by 1.

In the step S14, if the focus lens is not driven in a direction toward the far side, it is determined whether the difference diff is greater than the second threshold value threshold_low (step S23). If the difference diff is greater than the second threshold value threshold_low, the second count information dir_count_low is incremented (step S24). For example, the second count information dir_count_low may be incremented by 1 (+1). Next, it is determined whether the difference diff is greater than the first threshold value threshold_high (step S25). If the difference diff is greater than the first threshold value threshold_high, the first count information dir_count_high is also incremented (step S26). For example, the first count information dir_count_low may be incremented by 1 (+1). A sequence of determinations with respect to the first threshold value threshold_high and the second threshold value threshold_low may be reversed. Since the first threshold value threshold_high is greater than the second threshold value threshold_low, determination is first made with respect to the second threshold value threshold_low, which is the smaller one of the two, in the current embodiment. If required, determination may be first made with respect to the first threshold value threshold_high, and, if the difference is greater than the first threshold value threshold_high, determination with respect to the second threshold value threshold_low may be omitted.

If the difference diff is not greater than the second threshold value threshold_low, it is determined whether the difference diff is smaller than the negative second threshold value –threshold_low (step S27). If the difference diff is smaller than the negative second threshold value –threshold_low, the second count information dir_count_low is decremented (step S28). For example, the second count information dir_count_low may be decremented by 1 (–1). Next, it is determined whether the difference diff is smaller than the negative first threshold value –threshold_high (step S29). If the difference diff is smaller than the negative first threshold value –threshold_high, the first count information dir_count_high is also decremented (step S30). For example, the first count information dir_count_high may also be decremented by 1 (–1).

Furthermore, if the difference diff is smaller than the first threshold value threshold_high, first count information dir_count_high may not be set up. Alternatively, although not shown in the current embodiment, the first count information dir_count_high may be decremented by 1 (–1).

Furthermore, in the steps S27 and S29, if the difference diff is not smaller than the negative second threshold value –threshold_low or the negative first threshold value –threshold_high, the second count information dir_count_low and the first count information dir_count_high may not be incremented or decremented. Alternatively, the second count information dir_count_low and the first count information dir_count_high may be incremented by 1.

It is determined whether count information counted as described above corresponds to threshold count information. In detail, it is determined whether an absolute value (abs(dir_count_high)) of the first count information dir_count_high corresponding to the first threshold value threshold_high is 0 (step S31). In the current embodiment, 0 may correspond to first threshold count information. Since the first count information dir_count_high is counted in units of +1 or –1, the absolute value of the first count information dir_count_high may be identical to the final first count information.

If the absolute value of the first count information dir_count high is not 0, that is, if the absolute value (abs(dir_count_high)) of the first count information dir_count_high is 1 or greater, it is determined whether the first count information dir_count_high is greater than 0 (step S33). If the first count information dir_count_high is greater than 0, the target drive direction is determined to have a value of 1 (step S34). Determining that the target drive direction has a value of 1 may correspond to determining that a direction toward the near side is the target drive direction. If the first count information dir_count_high is not greater than 0, the target drive direction is determined to have a value of 2 (step S35). Determining that the target drive direction has a value of 2 may correspond to determining that a direction toward the far side is the target drive direction.

If the absolute value of the first count information dir_count_high is 0, it is determined whether the absolute value (abs(dir_count_low)) of the second count information dir_count low is greater than 3 (step S32). Here, second threshold count information is set to have a value of 3. Since the second count information dir count low is also counted in units of +1 or –1, the absolute value of the second count information dir_count_low may be identical to the final second count information. If the absolute value of the second count information dir_count_low is greater than 3, it is determined whether the second count information dir_count_low is greater than 0 (step S36). If the second count information dir_count low is greater than 0, the target drive direction is determined to have a value of 1 (step S37). Determining that the target drive direction has a value of 1 may correspond to determining that a direction toward the near side is the target drive direction. If the second count information dir_count_low is not greater than 0, the target drive direction is determined to have a value of 2 (step S38). Determining that the target drive direction has a value of 2 may correspond to determining that a direction toward the far side is the target drive direction.

If it is determined as a result of the determination in the step S32 that the absolute value of the second count information dir_count_low is below 3 or after the steps S34, S35, S37, and S38, it is determined again whether the target drive direction has been determined, that is, it is determined whether the target drive direction is the initial direction (a value of 0) (step S39). If the value of the target drive direction is not 0, the determined direction is determined as the target drive direction. If the value of the target drive direction is 0, it is determined whether the value of sequence_count is below 6 (step S40). If the value of sequence_count is smaller than 6, the focus lens is fine-driven in the same drive direction (step S41). Next, the method proceeds back to the step S5. If the value of sequence_count is above 6, time over processing is performed to determine whether a current position of the focus lens is close to the far side (step S42). If the current position of the focus lens is close to the far side, the target drive direction is set to have a value of 1, that is, a direction toward the near side (step S43). If the current position of the focus lens is close to the near side, the target drive direction is set to have a value of 2, that is, a direction toward the far side (step S44).

A direction determined as described above is determined as the target drive direction of the focus lens.

In the current embodiment, unlike the sequence of determinations with respect to the first threshold value and the second threshold value, it is first determined whether a value of the first count information is 0, and then determination is made with respect to the second count information. If a value of the first count information is not 0 and is above 0, a result of comparison with respect to the largest first threshold value exists, and thus the target drive direction may be determined based on results of comparison with respect to the first threshold value.

The invention provides a focusing apparatus having improved speed and reliability of the focusing apparatus by accurately and quickly determining a direction in which a focus lens is to be driven.

The invention can also be embodied as computer readable codes on a computer readable recording medium. The computer readable recording medium is any data storage device that can store data which can be thereafter read by a computer system.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A focusing apparatus comprising:
   a focus lens;
   a focus lens driving unit configured to drive the focus lens;
   an imaging device configured to capture light passed through the focus lens and incident on the imaging device and to generate an image signal;
   a focus evaluation value calculating unit configured to receive an image signal from the imaging device and to calculate a focus evaluation value of a captured image;
   a difference calculating unit configured to calculate a difference between a current focus evaluation value and a previous focus evaluation value;
   a first determining unit configured to compare the difference to each of a plurality of threshold values different from each other;
   a counter configured to
      count results of comparing the difference to each of the plurality of threshold values;
      generate first count information regarding a result of comparing the difference to a first threshold value,
      generate second count information regarding a result of comparing the difference to a second threshold value,
      increase the first count information by a predetermined value, if the focus lens is driven in a direction toward a near side and the difference is greater than the first threshold value,
      decrease the first count information by the predetermined value, if the focus lens is driven in a direction toward the near side and the difference is smaller than the first threshold value,
      decrease the first count information by the predetermined value, if the focus lens is driven in a direction toward a far side and the difference is greater than the first threshold value, and
      increase the first count information by the predetermined value, if the focus lens is driven in a direction toward the far side and the difference is smaller than the first threshold value; and
   a second determining unit configured to compare at least one of the first count information and the second count information to threshold count information and to determine a target drive direction in which the focus lens is to be driven.

2. The focusing apparatus of claim 1, wherein the threshold count information comprises a plurality of pieces of threshold count information respectively corresponding to the threshold values.

3. The focusing apparatus of claim 2, wherein
   the threshold count information comprises first threshold count information corresponding to the first threshold value and second threshold count information corresponding to the second threshold value and greater than the first threshold count information.

4. The focusing apparatus of claim 1, further comprising a current position determining unit configured to determine a current position of the focus lens,
  wherein, if the current position of the focus lens is close to a near side, the focus lens driving unit drives the focus lens in a direction toward a far side, and
  if the current position of the focus lens is close to the far side, the focus lens driving unit drives the focus lens in a direction toward the near side.

5. The focusing apparatus of claim 4, wherein the focus evaluation value calculating unit is further configured to calculate a focus evaluation value while moving the focus lens in a direction.

6. The focusing apparatus of claim 1, wherein the second determining unit is configured to compare at least one of the first count information, the second count information, and a sum thereof to corresponding threshold count information.

7. The focusing apparatus of claim 6, wherein, the second determining unit is configured to determine a target drive direction of the focus lens, if a value of the first count information is 1 or more.

8. The focusing apparatus of claim 1, wherein, the second determining unit is configured to determine a target drive direction, if the first count information satisfies first threshold count information corresponding to the first count information.

9. A focusing method, the method comprising:
  generating a first image signal;
  calculating a focus evaluation value of the first image signal as a previous focus evaluation value;
  driving the focus lens;
  generating a second image signal;
  calculating a focus evaluation value of the second image signal as a current focus evaluation value;
  calculating a difference between the current focus evaluation value and the previous focus evaluation value;
  comparing the difference to each of a plurality of threshold values different from each other;
  counting results of comparing the difference to each of the plurality of threshold values;
  generating first count information regarding a result of comparing the difference to a first threshold value;
  generating second count information regarding a result of comparing the difference to a second threshold value;
  increasing the first count information by predetermined value, if the focus lens is driven in a direction toward a near side and the difference is greater than the first threshold value;
  decreasing the first count information by the predetermined value, if the focus lens is driven in a direction toward the near side and the difference is smaller than the first threshold value;
  decreasing the first count information by the predetermined value, if the focus lens is driven in a direction toward a far side and the difference is greater than the first threshold value;
  increasing the first count information by the predetermined value, if the focus lens is driven in a direction toward the far side and the difference is smaller than the first threshold value; and
  comparing at least one of the first count information and the second count information to threshold count information and determining a target drive direction in which the focus lens is to be driven based on the comparison.

10. The focusing method of claim 9, wherein the threshold count information comprises a plurality of pieces of threshold count information respectively corresponding to the threshold values.

11. The focusing method of claim 9, wherein
  the threshold count information comprises first threshold count information corresponding to the first threshold value and second threshold count information corresponding to the second threshold value and greater than the first threshold count information.

12. A focusing apparatus comprising:
  a focus lens;
  a focus lens driving unit configured to drive the focus lens;
  an imaging device configured to capture light passed through the focus lens and incident on the imaging device and to generate an image signal;
  a focus evaluation value calculating unit configured to receive an image signal from the imaging device and to calculate a focus evaluation value of a captured image;
  a difference calculating unit configured to calculate a difference between a current focus evaluation value and a previous focus evaluation value;
  a first determining unit configured to compare the difference to each of a plurality of threshold values different from each other;
  a counter configured to
    count results of comparing the difference to each of the plurality of threshold values,
    generate first count information regarding a result of comparing the difference to a first threshold value,
    generate second count information regarding a result of comparing the difference to a second threshold value,
    increase the second count information by a predetermined value, if the focus lens is driven in a direction toward a near side and the difference is greater than the second threshold value,
    decrease the second count information by the predetermined value, if the focus lens is driven in a direction toward the near side and the difference is smaller than the second threshold value,
    decrease the second count information by the predetermined value, if the focus lens is driven in a direction toward a far side and the difference is greater than the second threshold value, and
    increase the second count information by the predetermined value, if the focus lens is driven in a direction toward the far side and the difference is smaller than the second threshold value; and
  a second determining unit configured to compare at least one of the first count information and the second count information to threshold count information and to determine a target drive direction in which the focus lens is to be driven.

13. The focusing apparatus of claim 12, wherein, the second determining unit is configured to determine a target drive direction, if the second count information satisfies second threshold count information corresponding to the second count information.

14. A focusing method, the method comprising:
  generating a first image signal;
  calculating a focus evaluation value of the first image signal as a previous focus evaluation value;
  driving the focus lens;
  generating a second image signal;
  calculating a focus evaluation value of the second image signal as a current focus evaluation value;

calculating a difference between the current focus evaluation value and the previous focus evaluation value;

comparing the difference to each of a plurality of threshold values different from each other;

counting results of comparing the difference to each of the plurality of threshold values;

generating first count information regarding a result of comparing the difference to a first threshold value;

generating second count information regarding a result of comparing the difference to a second threshold value;

increasing the second count information by a predetermined value, if the focus lens is driven in a direction toward a near side and the difference is greater than the second threshold value;

decreasing the second count information by the predetermined value, if the focus lens is driven in a direction toward the near side and the difference is smaller than the second threshold value;

decreasing the second count information by the predetermined value, if the focus lens is driven in a direction toward a far side and the difference is greater than the second threshold value;

increasing the second count information by the predetermined value, if the focus lens is driven in a direction toward the far side and the difference is smaller than the second threshold value; and comparing at least one of the first count information and the second count information to threshold count information and determining a target drive direction in which the focus lens is to be driven based on the comparison.

15. The focusing method of claim 14, wherein the threshold count information comprises a plurality of pieces of threshold count information respectively corresponding to the threshold values.

16. The focusing method of claim 15, wherein the threshold count information comprises first threshold count information corresponding to the first threshold value and second threshold count information corresponding to the second threshold value and greater than the first threshold count information.

* * * * *